Jan. 6, 1925.
LE ROY K. SHERMAN
DOSING APPARATUS
Filed Aug. 14, 1922
1,522,335
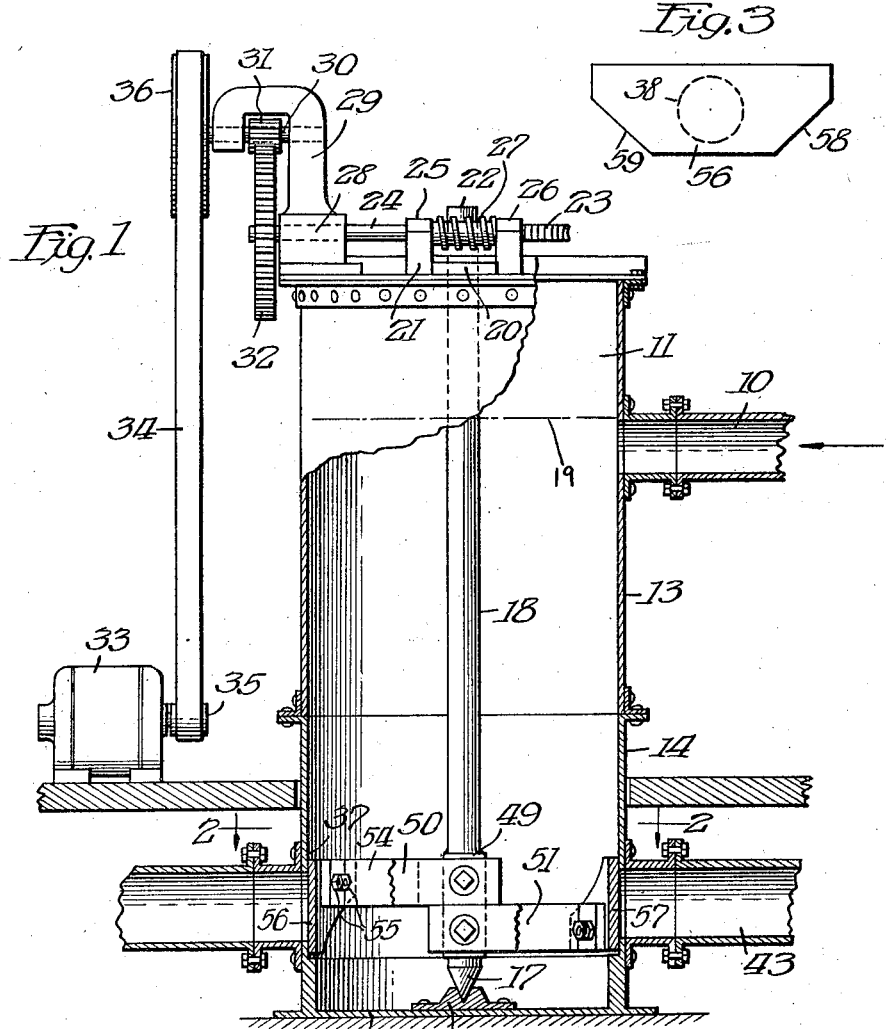
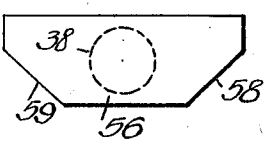
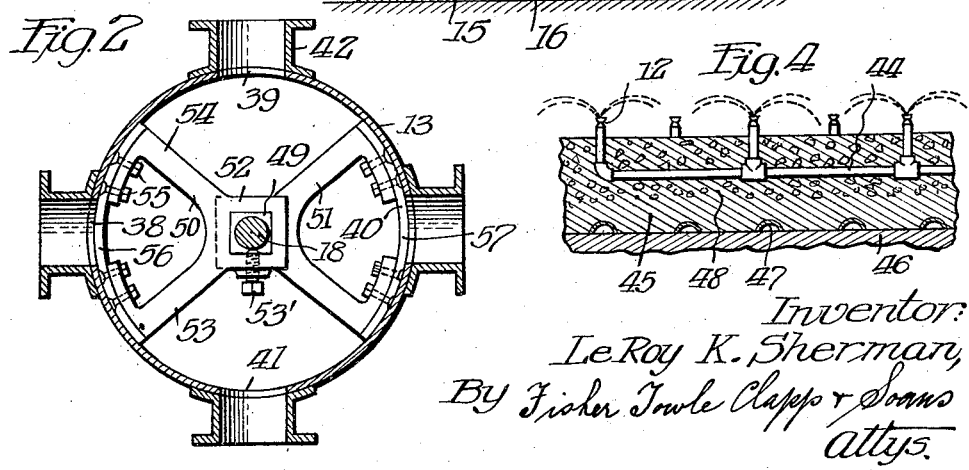
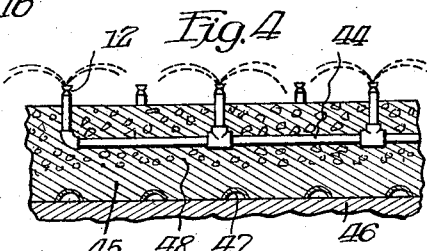
Inventor:
Le Roy K. Sherman,
By Fisher Towle Clapp & Soans
attys.

Patented Jan. 6, 1925.

1,522,335

UNITED STATES PATENT OFFICE.

LE ROY K. SHERMAN, OF OAK PARK, ILLINOIS, ASSIGNOR TO RANDOLPH-PERKINS COMPANY, OF CHICAGO, ILLINOIS.

DOSING APPARATUS.

Application filed August 14, 1922. Serial No. 581,585.

*To all whom it may concern:*

Be it known that I, LE ROY K. SHERMAN, a citizen of the United States, residing at Oak Park, in the county of Cook and State of Illinois, have invented certain new and useful Improvements in Dosing Apparatus, of which the following is a specification.

My invention relates to improvements in dosing apparatus, used in connection with the filter beds of sewage disposal systems.

In the type of sewage disposal system for which my invention is particularly well fitted, the sewage, after it leaves the sludge tanks or other receptacles where solid material settles out and is subjected to the action of the anaerobic bacteria, is delivered, by pumping or by gravity, to the contact beds or filter beds where the effluent from the sludge tanks is aerated and further purified by the aerobic bacteria. It has been found that, in order to get the best results from the action of the aerobic bacteria, it is desirable that a plurality of beds be installed, so that each bed may have a period of rest without interrupting the flow of sewage from the sludge tanks. The arrangement for accomplishing this purpose is known as a dosing system or apparatus.

The principal objects of my invention are to provide an improved dosing apparatus and system, so arranged that the flow of sewage from the sludge tanks will be automatically controlled, and intermittently applied and directed to the appropriate bed in a manner to effect maximum efficiency of the aerobic bacterial treatment, and at minimum expense.

Other objects and advantages of my invention are pointed out in the specification and in the claims appended thereto.

In the drawings of my application which illustrate a preferred form of apparatus as applied to distribution of the settling tank effluent to a series of filter beds equipped with the usual sprinkling apparatus.

Fig. 1 represents a vertical section through the distributing apparatus;

Fig. 2 is a section taken on the line 2—2 of Fig. 1;

Fig. 3 is a development of one of the shoes of the rotary valve, and

Fig. 4 is a vertical section through a portion of one of the filter beds.

Referring to the drawings, 10 represents the pipe through which is delivered the entire supply of partly purified sewage, after passing through the settling bins. The liquid flows directly into the pipe 10 from the settling tanks in a substantially continuous stream, without necessarily passing through any intermediate tanks or receptacles, its flow being substantially uniform and continuous, subject, of course, to the variations in flow through the sewers. The fluid may be conducted by gravity, or, in the absence of sufficient gravity, may be elevated by pumps into a relatively small distribution tank or valve chamber 11 located at such height above the filter nozzles 12 that proper head upon the nozzles is obtained. Ordinarily, the level of fluid in the tank 11 will be from four to ten feet above the nozzles 12.

The tank 11 takes the form of an axially vertical cylindrical casing, the upper portion 13 of which is preferably constructed of relatively light sheet steel, while the lower section 14 may be made of cast iron. The base 15 of the casting 14 constitutes a closure for the bottom of the tank or chamber and also as a support for a pedestal bearing 16, said pedestal bearing 16 being centrally disposed in the chamber 14 and rotatably sustaining the conical lower end 17 of the valve stem 18 coaxial with the chamber and extending upwardly therein.

The upper end of the valve stem 18 projects above the level 19 of liquid in the chamber 11 and is supported at the upper end of the tank in a bearing formed in a casting 20 supported in a suitable frame member 21 mounted on the upper end of the casing 13.

The upper end of the valve stem 18 projects above the top of bearing 20 and there is keyed to said projecting upper end 22 a worm gear 23. A worm shaft 24 is journaled in bearing lugs 25 and 26 integral with the bracket supporting the bearing 20 and between said bearings 25 and 26 there is keyed on the worm shaft 24 a worm 27 meshing with the worm gear 23. The outer end of the worm shaft 24 is extended through and supported by a bearing 28 in the bracket 29, which bracket 29 also is extended upwardly to form bearings for a horizontal pinion shaft 30. On the pinion shaft 30 there is keyed a spur pinion 31, which meshes with a large spur gear 32 keyed to the outer end of the worm shaft 24. The pinion shaft 30 is driven at comparatively low speed by a small electric motor 33 through a belt 34 trained around the motor pulley 35 and a large diameter pulley 36 keyed to the outer end of the pinion shaft 30. The motor 33 is continuously driven by any available electric power.

The interior of the base casting 14 is bored out cylindrically to constitute a smooth valve face 37 and is cored or drilled out to provide one or more valve ports, in the present instance, four such valve ports 38, 39, 40 and 41, communicating with independent flanged outlets as at 42. To each of the outlets 42, there is bolted a flanged end of a pipe as at 43 arranged to deliver sewage to a series of suitable distributing pipes as at 44 serving the nozzles 12 of a single filter bed 45. It will be understood that there are four of such filter beds which serve ports 38, 39, 40 and 41, and that they are of the usual construction. As indicated, such filter bed construction comprises an ordinary cement or concrete floor 46, equipped with drain tiles as at 47 and supporting a filtering medium 48 of properly graded broken stone. The nozzles 12 are arranged slightly above the level of the upper surface of the broken stone filtering medium 48, and, as shown, are of the customary umbrella spray type.

In the umbrella type of spray nozzle, for which my invention is particularly well fitted, the diameter or spread of the nozzle is determined by the head or pressure available at the nozzle opening, and it is found that with this type of nozzle, the efficiency of the filter bed and of the aerobic bacterial treatment of the sewage can be substantially increased, if the diameter of the nozzle spread can be progressively varied so that the entire area of bed surface within the effective range of the nozzle is sprayed during the period in which the filter bed is being dosed. The means by which this progressive variation of the nozzle spread is effected, constitutes an important feature of my invention.

On the lower end of the valve stem 18 there is formed an enlargement as at 49 made square in cross section to receive the rotary valve member which, in the present instance, is preferably made in two parts, 50 and 51. Each of said rotary valve parts 50 and 51 is of similar construction, and therefore, only one of same need be specifically described. As shown, the valve member 50 comprises a substantial hub 52 fitting the square enlargement 49 and secured thereto by a suitable set screw. The hub 52 is equipped with a pair of integral radially extending arms 53 and 54 on the outer ends of which there is secured by means of suitable bolts, as at 55, a valve shoe 56. The valve member 51 is equipped with a valve shoe 57 similar to valve shoe 56.

The two valve members 56 and 57 are vertically offset in opposite directions on their supporting arms so that the two valve members 56 and 57 will be located at the same height in the casing 14. The outer peripheries of the valve shoes 56 and 57 are turned off to fit within the cylindrical valve bore 37 and preferably each of said valve members has one of its leading and also one of its following corners bevelled off as indicated at 58 and 59 in Fig. 3. The height or vertical width of each of the valve shoes 56 and 57 is such as to completely cover the diameter of the valve ports.

With an apparatus constructed according to the foregoing description, good results can be secured, if the motor speed and connecting gearing is arranged to drive the valve stem 18 at a speed of about one revolution per hour. At this speed of rotation and with valve shoes constructed as indicated in Fig. 3, each of the group of four filter beds has a dosing cycle of 30 minutes. Such dosing cycle comprises a period of $7\frac{1}{2}$ minutes during which the port is entirely closed and the nozzles are consequently inactive to provide a breathing spell for the bed; a period of $7\frac{1}{2}$ minutes during which the port is being gradually uncovered by the rotary valve, the spread of the nozzle spray progressively increasing during said period; a period of $7\frac{1}{2}$ minutes during which the valve is completely opened and the diameter of the spray umbrella is at a maximum; and a period of $7\frac{1}{2}$ minutes during which the valve port is being gradually closed, the diameter of the nozzle spread gradually decreasing to zero during the closing period. By changing the shapes or sizes of the ports or valves, or both, the aforesaid periods may be altered as desired.

The advantages of my improved system, and which, so far as I am aware, have hitherto never been secured by existing systems, will be apparent to engineers and sanitarians skilled in the art of sewage disposal.

The chief advantage is the improved distribution of sewage upon the filter beds in cycles of time so that all portions of the filter beds are alternately subject to dosing by sewage followed by a definite and predetermined period for rest and aeration, this procedure being recognized in the art of sewage treatment by sprinkling filters as essential.

Among other advantages is the fact that with my system the distributing tank or valve chamber may be made of extremely small capacity, and hence manufactured and installed at a relatively low cost, since the sewage is conducted through the valve casing directly from the settling tanks to the filter beds. Hence, it is not necessary to provide storage or other large receptacles, as has heretofore been been the practice with certain systems. Furthermore, since the valve stem 18 is rotated at extremely low speed, the power consumed by the valve motor 33 is practically negligible. Also, it will be observed that the system will operate by gravity without the use of pumps, provided that the settling tanks are located at a comparatively small elevation above the filter beds.

The described details of construction and operation being merely illustrative of a single phase of my invention, it will be understood that the scope of same should be determined by reference to the appended claims, said claims being construed as broadly as possible, consistent with the state of the art.

I claim as my invention:

1. In a sewage disposal apparatus, a casing having an inlet port and an outlet port, a revoluble stem in said casing, and a valve shoe mounted on said stem, said shoe having a beveled corner to effect a gradual closing of said outlet port.

2. In a sewage disposal apparatus, a casing having an inlet and an outlet port, a revoluble valve stem in said casing, a valve shoe mounted on said stem and adapted to effect a gradual opening and closing of said outlet port, and means for effecting a continuous rotation of said stem.

3. In a sewage disposal apparatus, a casing having an inlet port and a plurality of outlet ports therein, a revoluble valve stem in said casing, and a valve shoe mounted on said stem and adapted to control said outlet ports, said shoe having a beveled corner to effect a gradual closing of said outlet ports.

4. In a sewage disposal apparatus, a casing having an inlet port and a plurality of outlet ports therein, a revoluble valve stem in said casing, and valve shoes mounted on said stem and adapted to control said outlet ports, each of said shoes having a beveled corner to effect a gradual opening of said outlet ports.

5. In a sewage disposal apparatus, a substantially cylindrical casing having an inlet port and a plurality of outlet ports therein, a revoluble valve stem mounted in said casing with its axis coincident with the axis of the casing, valve shoes mounted on said stem and adapted to control said outlet ports, each of said shoes having beveled corners to effect gradual opening and closing of said outlet ports, and means for continuously rotating said valve stem.

6. In a sewage disposal apparatus, a substantially cylindrical distributing tank, an inlet port in said tank, a plurality of outlet ports in said tank, a revoluble valve stem in said tank having its axis co-incident with the axis of said tank, radially extending arms mounted on said stem, valve members mounted on said arms and offset thereon to lie in substantially the same plane and successively close said outlet port as said stem is rotated, and means for continuously rotating said stem.

LE ROY K. SHERMAN.